(12) United States Patent
Sun

(10) Patent No.: US 7,515,759 B2
(45) Date of Patent: Apr. 7, 2009

(54) 3D VIDEO CODING USING SUB-SEQUENCES

(75) Inventor: Shijun Sun, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 902 days.

(21) Appl. No.: 10/938,153

(22) Filed: Sep. 10, 2004

(65) Prior Publication Data

US 2006/0013490 A1    Jan. 19, 2006

Related U.S. Application Data

(60) Provisional application No. 60/587,921, filed on Jul. 14, 2004.

(51) Int. Cl.
*G06K 9/36* (2006.01)
*G06K 9/46* (2006.01)

(52) U.S. Cl. .................. 382/234; 382/154; 382/233; 382/248

(58) Field of Classification Search .......... 382/154, 382/234, 236, 240, 248, 233; 375/240.12, 375/240.18, 240.25
See application file for complete search history.

(56) References Cited

U.S. PATENT DOCUMENTS

| | | | |
|---|---|---|---|
| 7,415,069 B2 * | 8/2008 | Winger | ................ 375/240.25 |
| 2002/0009137 A1 | 1/2002 | Nelson et al. | |
| 2003/0190079 A1 | 10/2003 | Penain et al. | |
| 2005/0084006 A1 | 4/2005 | Lei et al. | |

FOREIGN PATENT DOCUMENTS

WO    WO 01/76257 A1    10/2001

* cited by examiner

*Primary Examiner*—Phuoc Tran
(74) *Attorney, Agent, or Firm*—Michael Blaine Brooks, PC; Michael B. Brooks; David Ripma

(57) ABSTRACT

A stereo-view image sequence is coded in an H.264-based sub-sequence coding by coding a first view of the stereo-view image sequence into a base layer of a sub-sequence coding. The second view of the stereo-view image sequence is coded into an enhancement layer of the sub-sequence coding. Accordingly, the sub-sequence coding can be decoded by a baseline-profile-compliant H.264 decoder. In one exemplary embodiment of the decoder, the decoder decodes both the base layer and the enhanced layer of the sub-sequence coding. In another exemplary embodiment, the decoder decodes one of the base layer and the enhanced layer of the sub-sequence coding. Additionally, a Supplemental Enhancement Information (SEI) payload could be used for each frame to signal the relationship between the current view and the secondary view.

39 Claims, 2 Drawing Sheets

300

DECODE A FIRST VIEW OF A STEREO-VIEW IMAGE SEQUENCE CONTAINED IN A BASE LAYER OF A SUB-SEQUENCE CODING

301

DECODE A SECOND VIEW OF A STEREO-VIEW IMAGE SEQUENCE CONTAINED IN AN ENHANCEMENT LAYER OF A SUB-SEQUENCE CODING

302

3D VIDEO CODING USING SUB-SEQUENCES

CROSS-REFERENCE TO RELATED APPLICATION

The present application claims priority to U.S. Provisional Patent Application Ser. No. 60/587,921, entitled "3D Video Coding Using Sub-sequences," invented by S. Sun., filed Jul. 14, 2004, which is incorporated by reference herein.

BACKGROUND OF THE INVENTION

1. Field of the Invention

The present invention relates to video compression. In particular, the present invention relates to a technique for encoding three-dimensional (3D) or stereo-view video sequences.

2. Description of the Related Art

Conventional video compression techniques typically handle three-dimensional (3D), or stereo-view video, in units of a frame. The most straightforward technique is to code each of the two views separately, as independent video sequences. This straightforward technique, however, suffers from a relatively poor coding efficiency and has a relatively higher complexity because two bit streams must be coded and decoded, multiplexed and demultiplexed and synchronized.

In order to reduce the complexity of handling two bitstreams, synchronized frames from each view can be grouped together to form a composite frame. The composite frame can then be coded into a single bitstream. The approach of using a composite frame, nevertheless, suffers from poor coding efficiency, and view-scalable functionality is lost. That is, the composite-frame approach does not allow a decoder to choose to decode and display only one of the two views of the 3D image.

Another approach for coding a 3D video image is disclosed by U.S. patent application Ser. No. 2002/0009137 A1 to Nelson et al., which discloses a system that codes a 3D video image into a base-layer bitstream and an enhancement-layer bitstream. The base-layer bitstream can include either the right view image or the left view image and is coded and decoded independently of the enhancement-layer bitstream. The enhancement-layer bitstream includes view images that are not included in the base-layer bitstream, and is dependent upon the base-layer bitstream for encoding and decoding purposes. The Nelson et al. approach not only has a better coding efficiency than conventionally encoding two view separately, but view-scalable functionality is preserved. The Nelson et al. approach, nevertheless, has a relatively higher complexity because multiple bitstreams (i.e., the base-layer bitstream and the enhancement-layer bitstream) must be handled.

Still another approach for coding a 3D video image is disclosed by U.S. patent application Ser. No. 10/817,309, to S. Lei et al., entitled "System And Method For Three-Dimensional Coding," filed Apr. 2, 2004, which discloses a technique for coding stereo views using H.264 interlace video coding tools. The technique disclosed in U.S. patent application Ser. No. 10/817,309 will not, however, work for baseline profile applications because interlace video coding tools are only available for a decoder having the H.264 main profile or above. Consequently, in order for stereo-view sequences to be decoded by an H.264 baseline profile decoder, the stereo-view sequences must be conventionally coded as a pair of views forming a composite frame. Moreover, the video stream is not scalable and that the compression ratio is not optimal.

Consequently, what is needed is a technique for encoding a 3D sequence or a stereo-view sequence that can be decoded by an H.264 baseline profile decoder. Additionally, what is needed is a technique for encoding a 3D sequence or a stereo-view sequence that is view scalable, thereby allowing a 3D sequence or a stereo-view sequence to be decoded and/or viewed on a legacy two-dimensional (2D) display. Further, what is needed is a technique for encoding a 3D sequence or a stereo-view sequence that provides better coding efficiency than conventional techniques. Further still, what is needed is a technique for encoding a 3D sequence or a stereo-view sequence having flexible scalability.

SUMMARY OF THE INVENTION

The present invention provides a technique for encoding a 3D sequence, or a stereo-view sequence that can be decoded by an H.264 baseline profile decoder. Additionally, the present invention provides a technique for encoding a 3D sequence or a stereo-view sequence that is view scalable, thereby allowing a 3D sequence or a stereo-view sequence to be decoded and/or viewed on a legacy two-dimensional (2D) display. Further, the present invention provides a technique for encoding a 3D sequence or a stereo-view sequence that provides better coding efficiency than conventional techniques. Further still, the present invention provides a technique for encoding a 3D sequence or a stereo-view sequence having flexible scalability.

The advantages of the present invention are provided by a method of coding a stereo-view image sequence, in which the stereo-view image sequence has a first view and a second view. The first view of the stereo-view image sequence is coded into a base layer of a sub-sequence coding. Coding the first view of the stereo-view image sequence includes coding each frame of the first view based on a previous frame in the base layer sub-sequence. The second view of the stereo-view image sequence is coded into an enhancement layer of the sub-sequence coding. Coding the second view of the stereo-view image sequence includes coding each frame of the second view based on at least one of a previous frame in the base layer sub-sequence and a previous frame in the enhancement layer sub-sequence. The sub-sequence coding is an H.264-based sub-sequence coding that is decoded by a baseline-profile-compliant H.264 decoder. In one exemplary embodiment of the decoder, the decoder decodes both the base layer and the enhanced layer of the sub-sequence coding. In another exemplary embodiment, the decoder decodes one of the base layer and the enhanced layer of the sub-sequence coding.

In one exemplary embodiment of the present invention, a Supplemental Enhancement Information (SEI) payload can be included with at least one frame of the sub-sequence coding, such that the SEI payload indicates that a current frame is a predetermined view of a stereo-view pair of a stereo-view image. The predetermined view of the stereo-view pair could be a left view of the stereo-view pair. Alternatively, the predetermined view of the stereo-view pair could be a right view of the stereo-view pair.

In another exemplary embodiment of the present invention, a Supplemental Enhancement Information (SEI) payload can be included with at least one frame of the sub-sequence coding, such that the SEI payload indicates that a current frame and a next frame in output order form a stereo-view pair of a stereo-view image, and a display time of the current frame should be delayed to coincide with a display time of the next frame.

In yet another exemplary embodiment of the present invention, a Supplemental Enhancement Information (SEI) payload can be included with at least one frame of the sub-sequence coding, such that the SEI payload indicates that a current frame and a previous frame in output order form a stereo-view pair of a stereo-view image, and a display time of the previous frame should coincide with a display time of the current frame.

In still another exemplary embodiment of the present invention, a Supplemental Enhancement Information (SEI) payload can be included with at least one frame of the sub-sequence coding, such that the SEI payload indicates that a current frame and a previous frame in output order form a stereo-view pair of a stereo-view image, and presentation of the current frame will follow a time code of the previous frame.

In a further exemplary embodiment of the present invention, a Supplemental Enhancement Information (SEI) payload can be included with at least one frame of the sub-sequence coding, the SEI payload indicates that a current frame and a next frame in output order form a stereo-view pair of a stereo-view image, and a display time of the next frame should coincide with the display time of the current frame.

In another exemplary embodiment of the present invention, a Supplemental Enhancement Information (SEI) payload can be included with at least one frame of the sub-sequence coding, such that the SEI payload indicates that no inter prediction operations with a decoding process for first-view frames of the coded video sequence refer to reference frames that are second-view frames. The first-view frames could be left-view frames and the second-view frames could be right-view frames. Alternatively, the first-view frames could be right-view frames and the second-view frames could be left-view frames.

In yet another exemplary embodiment of the present invention, a Supplemental Enhancement Information (SEI) payload can be included with at least one frame of the sub-sequence coding, such that the SEI payload indicates that some inter prediction operations within a decoding process for first-view frames of the coded video sequence may refer to reference frames that are second-view frames. The first-view frames could be left-view frames and the second-view frames could be right-view frames. Alternatively, the first-view frames could be right-view frames and the second-view frames could be left-view frames.

The present invention also provides a method of decoding a stereo-view image sequence in which a first view of the stereo-view image sequence contained in a base layer of an H.264-based sub-sequence coding is decoded. A second view of the stereo-view image sequence contained in an enhancement layer of the sub-sequence coding is decoded. Decoding the first view of the stereo-view image sequence includes decoding each frame of the first view based on a previous frame in the base layer sub-sequence. Decoding the second view of the stereo-view image sequence includes decoding each frame of the second view based on at least one of a previous frame in the base layer sub-sequence and a previous frame in the enhancement layer sub-sequence.

BRIEF DESCRIPTION OF THE DRAWING

The present invention is illustrated by way of example and not by limitation in the accompanying figures in which like reference numerals indicate similar elements and in which.

DETAILED DESCRIPTION OF THE PRESENT INVENTION

The present invention provides a technique of coding multiple-view video frames as an H.264-based sub-sequence coding in order to provide flexible scalability and an improved compression ratio.

In the International Telecommunication Union (ITU-T) video coding standard, referred to as MPEG-4 Part 10 AVC/H.264, a picture is referred to as a "frame." Each frame of video sequence can be coded as one of two types—an Intra frame or an Inter frame. Intra frames, or I-frames, are coded in isolation from other frames by compressing data based on similarities within each region of a single frame. I-frames are coded without referring to reference frames and can be decoded independently of any other picture in the video sequence. An I-frame provides an access point for random access to stored digital video content and can be coded only with slight compression.

Inter frames are coded based on similarities in a region of one frame and a region of successive frames. Inter frames include predicted frames (P-frames) and bi-predicted frames (B-frames). A P-frame is coded using an I-frame, a P-frame or a B-frame that has already been coded as a reference picture. A B-frame is coded using a temporally forward reference frame and a temporally backwards reference frame.

A frame may be spatially sub-divided into two interlaced "fields". In an interlaced video transmission, a "top field" typically comes from the even lines of the frame, and a "bottom field" typically comes from the odd lines of the frame. For 3D or stereo-view sequences, the top and bottom fields of a frame can be coded as stereo-views of an image, such as disclosed by U.S. patent application Ser. No. 10/817,309, to S. Lei et al., entitled "System And Method For Three-Dimensional Coding," filed Apr. 2, 2004.

The H.264 standard allows use of multiple reference pictures and supports sub-sequence coding in which each Group of Pictures (GOP) includes a base layer and possibly one or more enhancement layers. The base layer of each Group of Pictures (GOP) includes one I-frame and a necessary number of P-frames to complete the GOP. One or more enhancement layers can be determined in addition to the base layer. Each enhancement layer improves the quality of video coding in comparison with an upper layer.

For example, if there are two layers of sub-sequences, the lower layer, e.g., base layer, is self-contained; and the higher layer, e.g., enhancement layer, is based on available reference pictures contained in both the base layer and the enhancement layer. The sub-sequence coding option in H.264 enables temporal scalability, which is different from the scalability coding options in preview standards, which can use only single reference picture for motion compensation.

Figure 1:
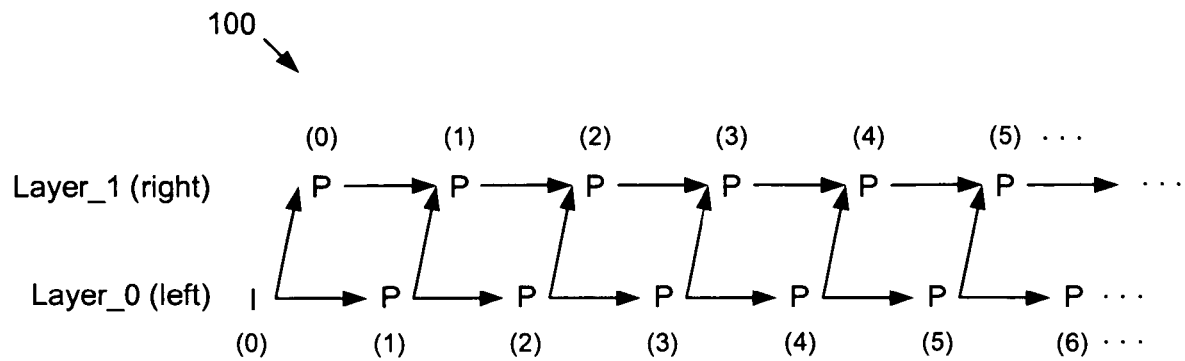
FIG. 1 depicts an exemplary multiple-view video coding of a Group of Pictures (GOP) having a sub-sequence.
Figure 2:
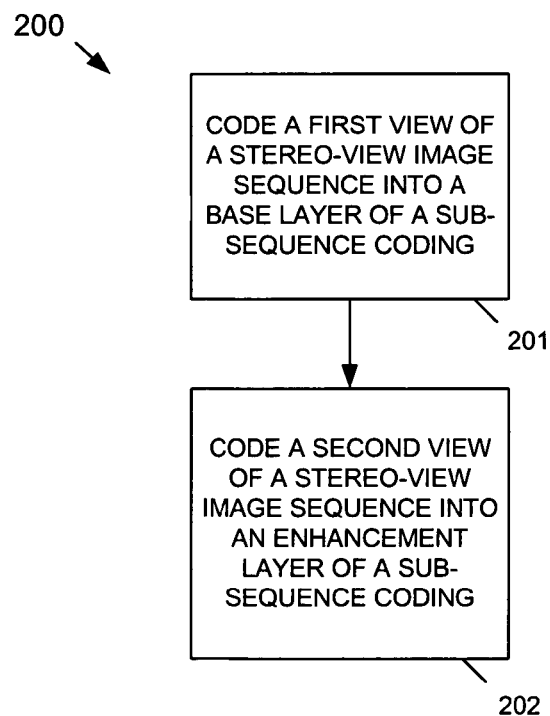
FIG. 2 depicts a flow diagram for an exemplary method of coding a stereo-view image sequence according to the present invention.

Instead of treating stereo-view video frames as composite video frame, as is done conventionally, the present invention arranges the separate views of a 3D or a stereo-view video frame into different sub-sequence layers. For example, FIG. 1 depicts an exemplary multiple-view video coding 100 of a Group of Pictures (GOP) having a sub-sequence. FIG. 2 depicts a flow diagram 200 for an exemplary method of coding a stereo-view image sequence according to the present invention. At step 201, a first view of the stereo-view image sequence is coded into the base layer of a sub-sequence coding. In FIG. 1, the left-view frames are coded in layer__0, or the base layer, using a well-known coding technique. At step 202 in FIG. 2, a second view of the stereo-view image sequence is coded into an enhancement layer of the sub-sequence coding. In FIG. 1, the right-view frames are coded in layer__1, or an enhancement layer, also using a well-known coding technique.

In greater detail, the first frame (frame (0)) in layer__0 is an I-frame. All subsequent frames (frames (1)-(6), etc.) in layer__0 are P-frames. Each P-frame in layer__0 is coded based on a previous frame in layer__0, whether an I-frame or a P-frame. Consequently, each frame in layer__0 can be decoded based only on frames contained in layer__0, the base layer.

The first frame (frame (0)) contained in layer__1 is a P-frame and all subsequent frames (frames (1)-(5), etc.) contained in layer__1 are P-frames. Each P-frame contained in layer__1 is coded based on at least one frame contained in layer__0. For example, the first P-frame in layer__1 is coded based on the I-frame. Typically, though, a P-frame contained in layer__1 is coded based on one frame contained in layer__0 and one frame contained in layer__1. Accordingly, P-frames contained in layer__1 subsequent to the first P-frame are coded based on a frame contained in layer__0 and a preceding frame contained in layer__1. Consequently, each frame in layer__1 can be decoded based only either on a frame contained in layer__0 and/or a frame contained in layer__1.

Figure 3:
FIG. 3 depicts a flow diagram of an exemplary method of decoding a stereo-view image sequence according to the present invention.

All coding results can be filled into a single bitstream, which can be decoded by any baseline-profile-compliant H.264 decoder. FIG. 3 depicts a flow diagram 300 of an exemplary method of decoding a stereo-view image sequence according to the present invention. At step 301, a first view of a stereo-view image sequence contained in a base layer of a sub-sequence coding is decoded. At step 302, a second view of the stereo-view image sequence contained in an enhancement layer of the sub-sequence coding is decoded.

Based on system configurations, the decoder can choose to decode only the layer__0 data and display only the left view. Alternatively or additionally, a video server can also send only layer__0 data when it is requested to do so.

Additionally, a Supplemental Enhancement Information (SEI) payload could be used for each frame to signal the relationship between the current view and the secondary view. Exemplary SEI messages could be as follows:

1. current_frame_left_view_flag. When the current_frame_left_view_flag is true (1), the current frame is the left view of a stereo-view pair. When the current_frame_left_view_flag is false (0), the current frame is the right view of a stereo-view pair. This message could alternatively be implemented as a current_frame_right_view_flag, a current_frame_primary_view_flag, a current_frame_secondary_view_flag or similar implementation, as understood by one of ordinary skill in the art.

2. next_frame_second_view_flag. When the next_frame_second_view_flag is true (1), the current frame and the next frame in output order form a stereo-view pair, and the display time of the current frame should be delayed to coincide with the display time of the next frame. When the next_frame_second_view_flag is false (0), the current frame and the previous frame in output order form a stereo-view pair, and the display time of the previous frame should not be delayed for purposes of stereo-view pairing. Alternatively, a previous_frame_second_view_flag may be used. When the previous_frame_second_view_flag is true (1), the current frame and the previous frame in output order form a stereo-view pair, and the display time of the current frame should coincide with the display time of the previous frame. When the previous_frame_second_view_flag is false (0), the current frame and the next frame in output order form a stereo-view pair, and the display time of the next frame should coincide with the display time of the current frame.

3. left_view_self_contained_flag. When the left_view_self_contained_flag is true (1), no inter prediction operations with the decoding process for the left-view frames of the coded video sequence refer to reference frames that are right-view frames. When the left_view_self_contained_flag is false (0), some inter prediction operations within the decoding process for the left-view frames of the coded video sequence may or may not refer to reference frames that are right-view frames.

4. right_view_self_contained_flag. When the flag is true (1), no inter prediction operations within the decoding process for the right-view frames of the coded video sequence refer to reference frames that are left-view frames. When the flag is false (0); some inter prediction operations within the decoding process for the right-view frames of the coded video sequence may or may not refer to reference pictures that are left-view pictures.

Table 1 shows a comparative performance in Peak Signal-to-Noise Ratio (PSNR) for an exemplary H.264 coder for coding a 2230-frame video sequence having six video clips as a composite frame coding (no scalability) and as a sub-sequence coding according to the present invention at three bit rates: 1.2 Mbps, 2.0 Mbps, and 2.5 Mbps. For the sub-sequence coding, the left view is coded in layer__0 and the right view is coded in layer__1.

TABLE 1

| Bit rate | 1.2 Mbps | 2.0 Mbps | 2.5 Mbps |
| --- | --- | --- | --- |
| Composite Frame Coding | 32.469 dB | 34.284 dB | 35.275 dB |
| Sub-sequence Coding | 32.528 dB | 34.507 dB | 35.369 dB |

For the coding performances as shown in Table 1, sub-sequence coding according to the present invention has a slightly better PSNR coding performance than composite frame coding, with the difference being as great as 0.2 dB. Moreover, sub-sequence coding allows flexible scalability.

It should be understood that identification and location of views as left or right might be arbitrary. Accordingly, the right-view frames could be contained in layer__0 and the left-view frames could be contained in layer__1 for example. The terms right and left have been used for convenience when, for example, discussing stereoscopic views. It should be understood that the respective views could be referred to more generally, such as a first view and a second view, or a primary and a secondary view, or other suitable terms.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of coding a stereo-view image sequence, the stereo-view image sequence having a first view and a second view, the method comprising:

coding a first view of a stereo-view image sequence into a base layer of a sub-sequence coding;

coding a second view of the stereo-view image sequence into an enhancement layer of the sub-sequence coding;

including a Supplemental Enhancement Information (SEI) payload with at least one frame of the sub-sequence coding; and outputting the sub-sequence coding.

2. The method according to claim 1, wherein the sub-sequence coding is an H.264-based sub-sequence coding.

3. The method according to claim 1, wherein coding the first view of the stereo-view image sequence includes coding each frame of the first view based on a previous frame in the base layer sub-sequence.

4. The method according to claim 1, wherein coding the second view of the stereo-view image sequence includes coding each frame of the second view based on at least one of a previous frame in the base layer sub-sequence and a previous frame in the enhancement layer sub-sequence.

5. The method according to claim 1, further comprising decoding the sub-sequence coding by a baseline-profile-compliant H.264 decoder.

6. The method according to claim 5, wherein decoding the sub-sequence coding includes decoding both the base layer and the enhanced layer of the sub-sequence coding.

7. The method according to claim 5, wherein decoding the sub-sequence coding includes decoding only one of the base layer and the enhanced layer of the sub-sequence coding.

8. The method according to claim 1 wherein the SEI payload indicates that a current frame is a predetermined view of a stereo-view pair of a stereo-view image.

9. The method according to claim 8, wherein the predetermined view of the stereo-view pair is a left view of the stereo-view pair.

10. The method according to claim 8, wherein the predetermined view of the stereo-view pair is a right view of the stereo-view pair.

11. The method according to claim 1 wherein the SEI payload indicates that a current frame and a next frame in output order form a stereo-view pair of a stereo-view image, and a display time of the current frame should be delayed to coincide with a display time of the next frame.

12. The method according to claim 1 wherein the SEI payload indicates that a current frame and a previous frame in output order form a stereo-view pair of a stereo-view image, and a display time of the previous frame should coincide with a display time of the current frame.

13. The method according to claim 1 wherein the SEI payload indicates that a current frame and a previous frame in output order form a stereo-view pair of a stereo-view image, and presentation of the current frame will follow a time code of the previous frame.

14. The method according to claim 1 wherein the SEI payload indicates that a current frame and a next frame in output order form a stereo-view pair of a stereo-view image, and a display time of the next frame should coincide with the display time of the current frame.

15. The method according to claim 1 wherein the SEI payload indicates that no inter prediction operations with a decoding process for first-view frames of the coded video sequence refer to reference frames that are second-view frames.

16. The method according to claim 15, wherein the first-view frames are left-view frames and the second-view frames are right-view frames.

17. The method according to claim 15, wherein the first-view frames are right-view frames and the second-view frames are left-view frames.

18. The method according to claim 1 wherein the SEI payload indicates that some inter prediction operations within a decoding process for first-view frames of the coded video sequence may refer to reference frames that are second-view frames.

19. The method according to claim 18, wherein the first-view frames are left-view frames and the second-view frames are right-view frames.

20. The method according to claim 18, wherein the first-view frames are right-view frames and the second-view frames are left-view frames.

21. A method of decoding a stereo-view image sequence, the method comprising:

decoding a first view of a stereo-view image sequence contained in a base layer of a sub-sequence coding;

decoding a second view of the stereo-view image sequence contained in an enhancement layer of the sub-sequence coding;

wherein at least one frame of the sub-sequence coding includes a Supplemental Enhancement Information (SEI) payload; and outputting at least one of: the decoded first view of the stereo-view image sequence and the decoded second view of the stereo-view image sequence.

22. The method according to claim 21, wherein the sub-sequence coding is an H.264-based sub-sequence coding.

23. The method according to claim 21, wherein decoding the first view of the stereo-view image sequence includes decoding each frame of the first view based on a previous frame in the base layer sub-sequence.

24. The method according to claim 21, wherein decoding the second view of the stereo-view image sequence includes decoding each frame of the second view based on at least one of a previous frame in the base layer sub-sequence and a previous frame in the enhancement layer sub-sequence.

25. The method according to claim 21, wherein the SEI payload indicates that a current frame is a predetermined view of a view pair of a stereo-view image.

26. The method according to claim 25, wherein the predetermined view of the view pair is a left view of the view pair.

27. The method according to claim 25, wherein the predetermined view of the view pair is a right view of the view pair.

28. The method according to claim 21, wherein the SEI payload indicates that a current frame and a next frame form a view pair a stereo-view image, and presentation of the current frame will follow a time code of the next frame.

29. The method according to claim 21, wherein the SEI payload indicates that a current frame and a previous frame form a view pair a stereo-view image, and presentation of the previous frame will follow a time code of the current frame.

30. The method according to claim 21, wherein the SEI payload indicates that a current frame and a previous frame form a view pair a stereo-view image, and presentation of the current frame will follow a time code of the previous frame.

31. The method according to claim 21, wherein the SEI payload indicates that a current frame and a next frame form a view pair a stereo-view image, and presentation of the next frame will follow a time code of the current frame.

32. The method according to claim 21, wherein the SEI payload indicates that all first-view frames will not use a second-view frame as a reference frame.

33. The method according to claim 32, wherein the first-view frames are left-view frames and the second-view frames are right-view frames.

34. The method according to claim 32, wherein the first-view frames are right-view frames and the second-view frames are left-view frames.

35. The method according to claim 21, wherein the SEI payload indicates that a first-view frame may use a second-view frame as a reference frame.

36. The method according to claim 35, wherein the first-view frames are left-view frames and the second-view frames are right-view frames.

37. The method according to claim 35, wherein the first-view frames are right-view frames and the second-view frames are left-view frames.

38. A method of processing a stereo-view image sequence, the stereo-view image sequence having a first view and a second view, the method comprising:
  coding the first view of a stereo-view image sequence into a base layer of a sub-sequence coding;
  coding the second view of the stereo-view image sequence into an enhancement layer of the sub-sequence coding;
  including a Supplemental Enhancement Information (SEI) payload with at least one frame of the sub-sequence coding;
  decoding the encoded first view of the stereo-view image sequence contained in a base layer of the sub-sequence coding; and
  decoding the encoded second view of the stereo-view image sequence contained in an enhancement layer of the sub-sequence coding; and
  outputting the stereo-view image.

39. A stereo-view image sequence processing system wherein the stereo-view image sequence comprises a first view and a second view, the system comprising:
  an encoder adapted to:
    code the first view of a stereo-view image sequence into a base layer of a sub-sequence coding; and
    code the second view of the stereo-view image sequence into an enhancement layer of the sub-sequence coding;
    include a Supplemental Enhancement Information (SEI) payload with at least one frame of the sub-sequence coding; and
  a decoder in operable communication with the encoder, wherein the decoder is adapted to:
    decode the encoded first view of a stereo-view image sequence contained in a base layer of the sub-sequence coding; and
    decode the encoded second view of the stereo-view image sequence contained in an enhancement layer of the sub-sequence coding.

* * * * *